United States Patent [19]

Summerfield

[11] Patent Number: 5,505,228

[45] Date of Patent: Apr. 9, 1996

[54] HYDRAULIC ACCUMULATOR

[76] Inventor: William F. Summerfield, 750 Brookside Blvd., Grants Pass, Oreg. 97526

[21] Appl. No.: 368,085

[22] Filed: Jan. 3, 1995

[51] Int. Cl.⁶ .................................................. F16L 55/04
[52] U.S. Cl. ............................................. 138/30; 138/26
[58] Field of Search .................. 138/26, 30; 220/403; 251/61.1

[56] References Cited

U.S. PATENT DOCUMENTS

| | | | |
|---|---|---|---|
| 2,105,160 | 1/1938 | Piquerez | 138/30 |
| 3,091,258 | 5/1963 | Marette | 138/30 |
| 3,593,744 | 7/1971 | Smith | 137/568 |
| 4,166,478 | 9/1979 | Sugimura et al. | 138/30 |

*Primary Examiner*—James E. Bryant, III
*Attorney, Agent, or Firm*—Roy A. Ekstrand

[57] ABSTRACT

A hydraulic accumulator includes an elongated pressure vessel having a headed end which receives a charging valve and an open end which receives a fluid port fitting. Means are provided for sealingly securing the fluid port fitting within the open end of the pressure vessel to complete the vessel closure. A fluid coupling is coupled to a port within the fluid port fitting which terminates in an inclined surface and spherical plug seat. An elongated flexible bladder is sealingly secured to the fluid port fitting and is maintained in a cylindrical form by a semicylindrical bladder support. A plug valve is secured to the interior of the flexible bladder and engages the plug seat during the operation of the accumulator in the absence of pressurized hydraulic fluid.

21 Claims, 2 Drawing Sheets

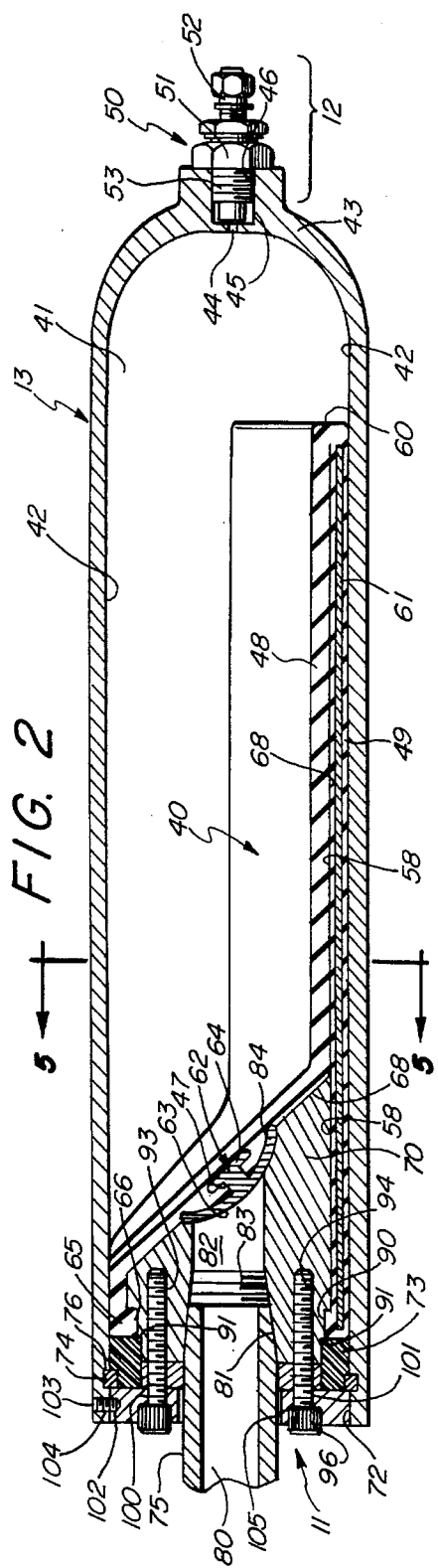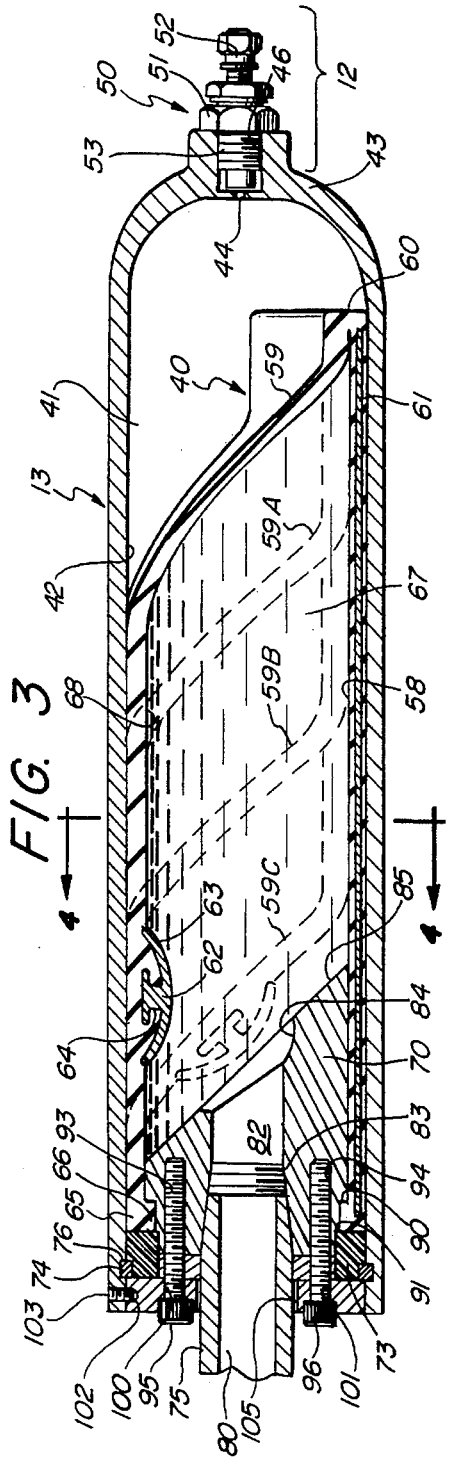

HYDRAULIC ACCUMULATOR

FIELD OF THE INVENTION

This invention relates generally to devices for controlling and compensating for abrupt pressure changes and surges in pressurized hydraulic systems.

BACKGROUND OF THE INVENTION

While hydraulic systems have found numerous applications and in accordance with those applications taken many forms and constructions, all include the basic components of a closed fluid system which is filled with a generally incompressible fluid and which is coupled to a positive discharge pump for imparting a pressure to and producing flow in the .confined hydraulic fluid within the system. The system further includes a valve arrangement which controls the flow of pressurized fluid to one or more hydraulic cylinders. The latter varies substantially in construction but generally comprises an inner chamber or cylinder which supports a movable piston coupled to a piston rod. Means are provided for applying the fluid under pressure via the valve system to move the piston in the desired direction and thereby move the piston rod and accomplish the mechanical work output of the system. Thus, in its basic use, the hydraulic system is operative using the pump to provide fluid under pressure within the system while an operator manipulates the valve arrangement to control the motions of the various hydraulic cylinders within the system.

Hydraulic systems have become capable of producing great mechanical power and manipulating very sizeable loads. In accomplishing this power handling capability, many hydraulic systems function with a large number of hydraulic cylinders and utilize pumps providing very substantial fluid pressures. Because of the use of a hydraulic fluid which is generally incompressible and because rapid volume changes are produced as the system functions in Its normal manner, the system is subject to abrupt pressure changes and flow surges which must be accommodated and controlled if the system is to function reliably.

This problem of compensating for and controlling sudden pressure changes and flow surges within fluid systems is not unique to hydraulic power systems. Such problems also arise in pipeline distribution operations in which a generally incompressible fluid is being pumped under pressure through a network of pipelines to various destinations.

To meet the problem of pressure changes and flow surges within confined systems of incompressible fluids, practitioners in the art have provided a variety of devices known generically as pulsation dampers or accumulators. While the individual structures of such accumulators vary substantially, they typically provide among their other components a closed vessel coupled to the fluid system and containing a quantity of the system fluid as well as a confined volume of a compressible fluid or gas under pressure arranged such that the volume of incompressible fluid within the accumulator may rapidly change relying upon the compressible fluid to absorb or discharge the incompressible fluid as pressure surges and pressure changes within the system occur.

U.S. Pat. No. 4,186,776 issued to Burton sets forth a PULSATION DAMPENER OR SURGE ABSORBER which includes a pressure vessel having a diaphragm or bladder disposed therein for forming two noncommunicating zones within the vessel. The first zone is coupled to the incompressible fluid while the second zone is precharged with a compressible fluid. The bladder is of the reverse folding type and is provided with shock absorber means and an inlet bridging disk to protect the diaphragm when the pulsating fluid pressure is reduced.

U.S. Pat. No. 3,483,893 issued to Morley sets forth a HYDROPNEUMATIC ACCUMULATOR having a pressure vessel which supports a flexible bladder arranged to receive a relatively incompressible hydraulic fluid on one side of the bladder and a precharge of compressible fluid on the other side. The pressure vessel and the bladder are elongated; and support means within the pressure vessel provide positioning support for the bladder.

U.S. Pat. No. 3,115,162 issued to Posh sets forth an ACCUMULATOR in which an elongated generally cylindrical cylinder forms a pressure vessel having a central passageway enclosed by a rubber sleeve and having a chamber thereabout containing a compressible gas under pressure. The incompressible fluid is coupled to the interior of the rubber sleeve such that the compressible gas confined between the outer chamber and the rubber sleeve impart a pressure against the incompressible fluid. The configuration of the rubber sleeve changes to accommodate pressure changes and surges within the incompressible fluid.

U.S. Pat. No. 3,893,485 issued to Loukonen set forth a PULSATION DAMPENER which includes an elongated pressure chamber having therein a bladder assembly having a bladder which retains its surface area during pulsation dampener. The bladder is axially and longitudinally symmetrical. The bladder assembly comprises a bladder double-sealed at both longitudinal ends by a metal plate to prevent leakage. Pulsation changes cause the bladder to assume a clover leaf cross-sectional configuration.

U.S. Pat. No. 4,084,621 issued to Sugtmura sets forth an ACCUMULATOR CONSISTING OF WELDED VESSEL AND LID in which the pressure vessel of the hydraulic accumulator comprises a bowl-shaped body and lid member welded together edge to edge. A bowl-shaped diaphragm is supported by a rigid ring within the interior of the pressure vessel.

U.S. Pat. No. 273,379 issued to Miller sets forth a DEVICE FOR PREVENTING HAMMER IN WATER PIPES comprising an elongated flexible tube predisposed to curl into a helix and which is in communication with a pressurized water system. The helical tube uncoils in response to increased water pressure.

U.S. Pat. No. 2,721,580 issued to Greer sets forth a BLADDER TYPE PRESSURE ACCUMULATOR having an elongated pressure vessel supporting an elongated flexible bladder therein. One end of the pressure vessel is sealingly connected to the bladder and supports a valve for precharging the bladder with a quantity of compressible fluid. The other end of the bladder supports a valve arrangement for communicating the remaining portion of the accumulator to the incompressible fluid system.

U.S. Pat. No. 4,166,478 issued to Sugimura, et al. sets forth an ACCUMULATOR having a bladder to be filled with liquid in which an elongated pressure vessel supports a valve at one end which permits the vessel to be precharged with a quantity of compressible fluid and a coupling at the other end which is sealingly coupled to an elongated bladder within the vessel interior and to the system utilizing the incompressible fluid. The bladder extends upwardly within the vessel interior and divides the vessel interior into inner and outer compartments to separate the compressible fluid from the incompressible fluid. An inverted cone-shaped member is supported within the bladder and cooperates with a perforated rigid shell at the inlet to the interior of the bladder to prevent damage to the bladder during rapid discharge of the incompressible fluid.

U.S. Pat. No. 3,277,925 issued to Suglmura sets forth an ACCUMULATOR in which an elongated pressure vessel supports an elongated flexible bladder and is sealingly coupled to a charging port at the top of the vessel which permits the precharging of the bladder with a quantity of compressible fluid. A valve at the lower end of the pressure vessel is communicated to the system utilizing the incompressible fluid whereby the precharged compressible fluid within the bladder exerts a pressure against the incompressible fluid.

U.S. Pat. No. 3,091,258 issued to Marette sets forth a HOSE ACCUMULATOR in the form of an elongated hydraulic hose having an axially extending internal diaphragm which separates the hose interior into a hydraulic chamber and a compressible gas chamber extending lengthwise along the full length of the hose. The gas chamber is coupled to a inlet permitting the precharge of the gas chamber with a compressible gas while the hydraulic chamber is coupled to the hydraulic system. The chambers are separated by the internal diaphragm which flexes and changes shape without stretching to accommodate the proportional change in volume of the two chambers.

U.S. Pat. No. 4,174,741 Issued to Parsons, et al. sets forth METHODS FOR LOADING AND UNLOADING LIQUIDS FROM A RAILROAD TANK CAR in which an elongated closed tank car is provided with a pair of inlet ports and a pair of outlet ports and a flexible member sealingly dividing the tank car interior such that one set of inlet ports are disposed on one side of the sealing divider while the remaining set of inlet and outlet ports are positioned on the remaining side. The sealing divider is moved to one side of the tank car interior by filling the tank car through one of the inlet ports and is movable to the opposite side of the tank car interior when the tank car is filled through the other inlet port. Thus, the tank car is capable of carrying two different fluids at different times without the need of expensive cleaning of the tank car interior as each different fluid is used due to the division provided by the sealing member.

While the foregoing described hydraulic accumulators provide various levels of performance in accommodating and absorbing pressure changes within hydraulic systems, they are often subject to one or more problems associated with the use of the flexible bladder. For example, the flexing and movement Of the bladder within the pressure vessel frequently causes substantial wear of the bladder and ultimately results in fracture thereof which of course renders the accumulator unusable. By way of further example, a problem arises in the prior art accumulators when the incompressible fluid is completely exhausted from the accumulator. Under such conditions, the pressure of the compressible gas precharge often forces the bladder against the inlet with sufficient force to damage it and render the accumulator inoperative. While the foregoing systems which are representative of the prior art have attempted through various means to meet this problem, it is believed that a need continues in the art for an improved hydraulic accumulator which better resists the abrasion of the bladder and the damage thereto resulting when the accumulator is exhausted of hydraulic fluid.

While bladder type accumulators have provided considerable benefit in accommodating pressure changes and pressure surges within hydraulic systems, the use of the flexible bladder within the pressure vessel has been subject to a number of problems. One of the more common problems associated with bladder type hydraulic accumulators arises from the general wear and abrading which occurs as the bladder is subjected to being wrinkled, folded and often crushed within the pressure vessel during periods of operation in which a substantial amount of the hydraulic fluid is discharged or drawn from the pressure vessel. The wrinkling, twisting and abrading reduces the bladder life by causing it to rupture and requires that the hydraulic accumulator be discarded or repaired.

Other problems arise during system operations in which a high flow rate during discharge of hydraulic fluid from the accumulator takes place. With little or no hydraulic fluid left in the accumulator, the precharged compressible gas exerts an expanding force upon the bladder driving it against the fluid outlet of the accumulator. In the event the discharge rate of hydraulic fluid is high enough, the force imparted to the bladder by the compressed charge of gas can drive a portion of the bladder against the hydraulic fluid outlet and in some cases expel part of the bladder material out through the hydraulic fluid inlet port. This phenomenon known as extrusion of the bladder can destroy the bladder and contaminate the hydraulic system.

To meet this problem of bladder extrusion, practitioners in the art have provided various mechanisms which are intended to plug or close the hydraulic fluid port under conditions which would otherwise produce bladder extrusion. One of the most common systems provides a button or plug secured to the end of the bladder so that the plug is driven into the hydraulic fluid inlet port during operations in which substantially all of the hydraulic fluid is discharged from the accumulator. The problem with such button or plug systems is alignment. The folding or wrinkling of the bladder during hydraulic fluid discharge is generally imprecise and misalignment between the plug and the hydraulic fluid inlet port often causes the plug to fall to seal the inlet port. Another attempted solution to extrusion uses a popper valve device positioned within the hydraulic fluid inlet port which senses high flow discharging and closes to isolate the accumulator from the hydraulic system. While this popper valve system protects the accumulator, it functions to isolate the hydraulic accumulator from the hydraulic system at precisely the time it is most needed and therefore is generally unsatisfactory.

Still other problems result in the use of such hydraulic accumulators in their preference for functioning best with a vertical axis. Because the hydraulic fluid within the accumulator is a liquid subject to being repositioned due to gravity forces and because the flexible bladder charged with a compressible gas tends to float within the hydraulic fluid, the operation of hydraulic accumulators generally requires that the accumulator be maintained in a substantially vertical orientation.

The various problems associated with bladder malfunction when the accumulator is operated with most of the hydraulic fluid discharged from the accumulator have prompted hydraulic system designers to substantially oversize the hydraulic accumulators within a system to provide a safety factor or margin for reliable system operation. This oversizing of hydraulic accumulators substantially increases the cost of the hydraulic system equipment. In addition, it is often inconvenient to utilize an oversized accumulator due to space restrictions.

SUMMARY OF THE INVENTION

Accordingly, it is a general object of the present invention to provide an improved hydraulic accumulator. It is a more particular object of the present invention to provide an improved hydraulic accumulator which permits the motion of the barrier bladder without subjecting the bladder to abrasive forces. It is a still more particular object of the present invention to provide an improved hydraulic accumulator utilizing a flexible bladder in which the bladder is protected from damage during rapid exhaustion of the hydraulic fluid from the accumulator.

In accordance with the invention, there is provided a hydraulic accumulator comprising an elongated pressure vessel having first and second ends and a continuous wall therebetween forming an interior chamber having an interior chamber wall, means within the interior chamber of the pressure vessel permitting the injection of a charge of compressible fluid, a fluid coupling supported at the second end of the pressure vessel, an elongated flexible bladder having a first portion sealingly coupled to the fluid coupling and having an exterior shape generally corresponding to the interior chamber and a tapered closed second end portion, and bladder support means conforming a portion of the bladder against the interior chamber wall.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 2 is a section view of the present Invention hydraulic accumulator taken along Section lines 2—2 in FIG. 5 shown when the present invention hydraulic accumulator is empty;

FIG. 3 is a section view of the present invention hydraulic accumulator taken along section lines 3—3 of FIG. 4 showing the present invention hydraulic accumulator filled with hydraulic fluid;

DESCRIPTION OF THE PREFERRED EMBODIMENT

Figure 1:
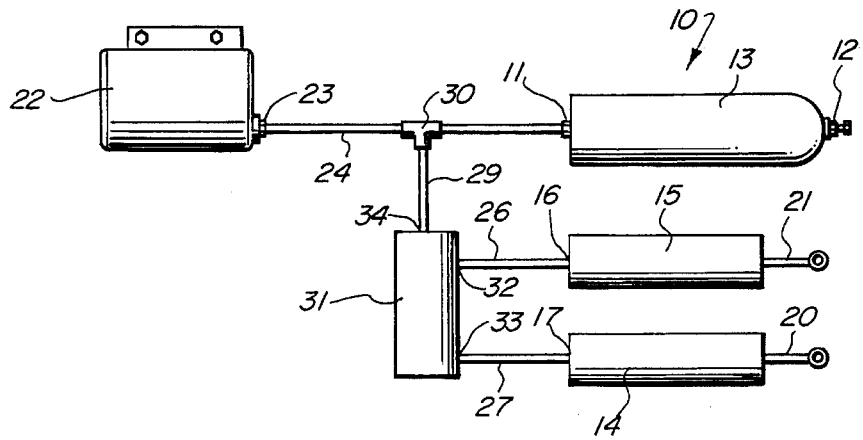
FIG. 1 is a block diagram of a hydraulic system having a hydraulic accumulator constructed in accordance with the present Invention.

FIG. 1 sets forth a simplified hydraulic system utilizing the present invention hydraulic accumulator. A pump 22 constructed in accordance with conventional hydraulic pump techniques provides a source of pressurized hydraulic fluid at discharge port 23. A conventionally constructed hydraulic cylinder 14 includes a piston rod 20 extending outwardly from cylinder 14 and a fluid coupling 17. A second hydraulic cylinder 15, also constructed in accordance with conventional hydraulic cylinder fabrication techniques, includes an outwardly extending piston rod 21 and a fluid coupling 16. Hydraulic cylinders 14 and 15 are representative of any number of conventional hydraulic actuation devices in which hydraulic fluid under pressure is employed to exert force against an internal piston (not shown) which is coupled to one or more load bearing members by piston rods 20 and 21 respectively. It should be understood that some hydraulic plumbing Is omitted from FIG. 1 for simplicity and alternate arrangements may be used. A control valve 31 constructed in accordance with conventional control valve techniques includes an inlet port 34 coupled to pump 22 by a hydraulic line 29, a coupling 30 and a hydraulic line 24. Control valve 31 further includes a pair of outlets 32 and 33 coupled by hydraulic lines 26 and 27 respectively to hydraulic cylinders 15 and 14 respectively. In accordance with conventional control valve fabrication techniques, control valve 31 provides the interface between the system operator and the working devices such as hydraulic cylinders 14 and 15. In further accordance with conventional fabrication techniques, control valve 31 functions in response to operator control inputs to control the flow of pressurized hydraulic fluid to hydraulic cylinders 14 and 15 to provide the desired response of piston rods 20 and 21 respectively.

A hydraulic accumulator 10 constructed in accordance with the present invention and set forth below in greater detail includes a closed pressure vessel 18 having a charging valve 12 at one end and a fluid coupling 11 at the other end. A hydraulic line 25 couples fluid coupling 11 to coupling 30 of the hydraulic system. In accordance with the structure set forth below in greater detail, hydraulic accumulator 10 is precharged with a controlled pressure of compressible gas through charging valve 12. Hydraulic fluid is supplied to accumulator 10 through fluid coupling 11. A flexible bladder (shown below) is interposed between the hydraulic fluid and the compressible fluid charge to maintain the separation of the two.

In operation, as pump 22 provides a pressurized positive flow of hydraulic fluid to the system, the operator manipulates control valve 31 to vary the positions of piston rods 20 and 21 of hydraulic cylinders 14 and 15 respectively. As the flow of pressurized hydraulic fluid within the system is varied by control valve 31, the fluid pressure within the system is varied and pressure surges characterized by abrupt pressure increases and decreases are created from time to time as control valve 31 manipulates the activity of hydraulic cylinders 14 and 15. Similar system pressure drops can be caused also by sudden loss of mechanical resistance against the piston rods 20 or 21. In accordance with the structure set forth below in greater detail, hydraulic accumulator 10 responds to these pressure changes to absorb pressure surges and prevent damage to the system and to supply pressurized fluid to the system during sudden decreases in pressure caused, for example, by the movements of the pistons within hydraulic cylinders 14 and 15 under light load conditions. Thus, as hydraulic accumulator 10 functions to absorb and accommodate pressure changes within the hydraulic system, hydraulic fluid flows more or less rapidly into and out of pressure vessel 13 via fluid coupling 11.

Figure 5:
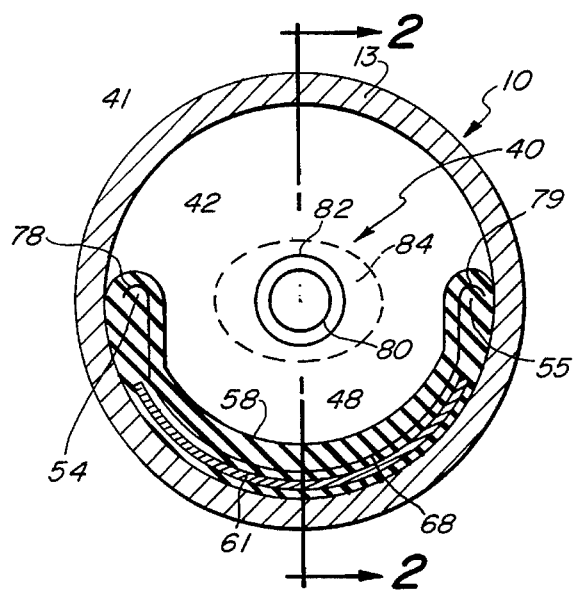
FIG. 5 is a section view of the present invention hydraulic accumulator taken along Section lines 5—5 of FIG. 2.

FIG. 2 sets forth a sectional view of accumulator 10 taken along Section lines 2—2 in FIG. 5 prior to the introduction of hydraulic fluid into the accumulator. A pressure vessel 13, preferably formed of steel or other suitable high tensile strength material, defines a generally cylindrical cross section member having an interior chamber 41. Pressure vessel 13 further defines an interior chamber wall 42 and a chamber head 43. Chamber head 43 is shown generally dome-shaped and defines an aperture 44 at its center and a valve recess 45. Valve recess 45 is generally concentric with aperture 44 and defines a plurality of internal threads 46. A charging valve 12, which may be constructed of any of the presently available conventional charging valves, defines a generally cylindrical elongated valve body 50 which in turn defines a plurality of external threads 53 which are sized and configured to be received within threads 46 of recess 45. Thus, charging valve 12 is secured within valve recess 45 of chamber head 43 by the cooperation of threads 46 and 53. A lock nut 51 is threadably received upon threads 53 and is drawn against valve recess 45 to secure charging valve 12 to chamber head 43, Charging valve 12 further defines conventional valve closure means 52 which permits the introduction of a compressed gas through aperture 44 into internal chamber 41 and which permits sealing closure of charging valve 12 to retain the charge thus transferred.

A fluid port fitting 70 defines a generally truncated cylindrical shape configured to be received within internal chamber 41 and having an inclined surface 85 and a center passage 82 extending through fluid port fitting 70. Passage 82 further defines a plurality of internal threads 83 and a plug seat 84 which surrounds passage 82 at surface 85 and defines a generally spherical concave surface. It will be apparent, however, that other connections may be used. Fluid port fitting 70 further defines an inwardly extending annular groove 90 and an annular lip 91. A nipple 75, typical of the nipple fittings found in hydraulic systems, includes an internal passage 80 and a plurality of threads 81.

Pressure vessel 13 further defines an annular extending groove 76 and an open end 77. An end cap 72 comprises an annular disk-like member configured to be received within open end 77 of pressure vessel 13. End cap 72 further defines a center aperture 105 and a plurality of bolt apertures 100 and 101 spaced about center aperture 105. End cap 72 further defines a recess 102. Pressure vessel 13 further defines an aperture 104 which is aligned with recess 102 and permits a set screw 103 to be threadably received within recess 102 and extend partially into aperture 104. Set screw 103, aperture 104 and recess 102 cooperate to align end cap 72 in the proper position within open end 77 of pressure vessel 13.

Fluid port fitting 70 defines a plurality of threaded apertures 93 and 94 which correspond in axial alignment and position to apertures 100 and 101 respectively in end cap 72. A plurality of threaded bolts such as bolts 95 and 96 extend through apertures 100 and 101 respectively in end cap 72 and are threadably received within threaded apertures 93 and 94 respectively of fluid port fitting 70. A split ring 74, constructed in accordance with conventional split ring fabrication techniques, is received within groove 76 and abuts the inner surface of end cap 72 in the position shown in FIG. 2. A seal ring 73 is received upon split ring 74 and abuts end cap 72. In addition, resilient seal ring 73 abuts lip 91 of fluid port fitting 70. In the assembled position shown in FIG. 2, bolts 95 and 96 are tightly threaded into threaded apertures 93 and 94 which in turn draws fluid port fitting 70 toward end cap 72. In addition, the drawing force provided by bolts 92 and 96 between end cap 72 and fluid port fitting 70 compresses seal ring 73 and provides a binding and sealing force which maintains a gas and liquid tight seal between chamber wall 42 of pressure vessel 13, end cap 72 and fluid port fitting 70. Thus, except for passage 80 in nipple 75 and passage 82 in fluid port fitting 70, pressure vessel 13 provides a closed confined chamber 41.

In accordance with an important aspect of the present invention, hydraulic accumulator 10 further includes a flexible bladder 40 formed of a resilient material, such as rubber or the like, which defines a generally cylindrical member having a closed end 60 at one end and an annular ring end 65 at the other end. Ring end 65 further includes an inwardly extending annular ridge 68. Bladder 40 further defines a bladder interior 67 (better seen in FIG. 3) and a pair of semicylindrical interior surfaces 58 and 68. Ring end 65 is positioned adjacent to seal ring 73 such that ridge 66 is received within groove 90 of fluid port fitting 70. In the above-described assembly process in which bolts 95 and 96 draw fluid port fitting 70 and end cap 72 together, the cooperation of groove 90, ridge 66 and ring end 65 further completes the seal between bladder 40 and fluid port fitting 70 such that bladder interior 67 is, with the exception of passage 82, entirely sealed forming a closed volume. A plug member 62 formed of a strong rigid material such as metal and having a generally spherical sealing surface 63 and an annular plug anchor 64 is received upon and secured to surface 68 of bladder 40. In the preferred attachment, surface 68 of bladder 40 defines a plug recess 47 which conforms generally to the shape of plug anchor 64 and receives plug anchor 64 in a captivating attachment such that plug 62 is secured to surface 68 in the position shown in FIGS. 2 and 3. It will be apparent, however, to those skilled in the art that any number of attachment mechanisms may be used to secure plug 62 to surface 68 of bladder 40. In accordance with an important aspect of the present invention, sealing surface 63 conforms to the contour of plug seat 84 and when positioned as shown in FIG. 2 provides a sealing closure of passage 82.

The position of bladder 40 in FIG. 2 depicts the initial situation in which a charge of compressible fluid or gas has been introduced into interior chamber 41 by the operation of charging valve 12. As described above, once the charge has been transferred to internal chamber 41, charging valve 12 closes by operation of valve closure 52. Due to the above-described sealing action operative upon ring end 65 of bladder 40, the charge introduced is securely maintained within internal chamber 41 but outside of the bladder interior 67. In the absence of hydraulic fluid pressure applied via passages 80 and 82, plug 62 is forced against plug seat 84 in the above-described sealing closure. In this situation, the pressure within internal chamber 41 forces bladder 40 into the configuration shown in FIG. 2 in which surfaces 58 and 68 are brought into contact and the volume of bladder interior 67 is reduced to a near zero volume. In this configuration, bladder 40 assumes a semicylindrical trough-like configuration in which surface 68 is forced against surface 85 of fluid port fitting 70 and plug 62 is maintained against plug seat 84. In the configuration shown in FIG. 2, bladder 40 is entirely compressed and the charge within internal chamber 41 is maintained. A bladder support 61, formed of a material such as steel and having a generally semicylindrical shape, is disposed within the portion of bladder 40 overlying chamber wall 42 and underlying surface 58. Bladder support 61 functions to provide a preformed configuration of bladder 40 which maintains wall portion 49 in a semicylindrical configuration against chamber wall 42. Wall portion 48 of bladder 40 is however free to move with respect to wall portion 49 as shown below in FIG. 3 as hydraulic fluid enters bladder interior 67.

It will be apparent to those skilled in the art that while the section view of FIG. 2 sets forth a pair of bolts 95 and 96 securing end cap 12 to fluid port fitting 70, a plurality of additional bolts are similarly received within fluid port fitting 70 and pass through similar apertures within end cap 12 and are radially disposed about aperture 105 to provide an evenly distributed clamping force between end cap 72 and fluid port fitting 70.

FIG. 3 sets forth the same section view of the present invention hydraulic accumulator taken along the same section lines as used in FIG. 2 but depicting the relative positions of components within the hydraulic accumulator which result from the introduction of hydraulic fluid under pressure. With simultaneous reference to FIGS. 2 and 3, it will be apparent that pressure vessel 13, charging valve 12, end cap 72 and fluid port fitting 70 assume the same positions shown in FIG. 2. Thus, fluid port fitting 70 receives bolts 95 and 96 in an assembly which draws fluid port 70 tightly to end cap 72 causing seal ring 78 and ring end 65 to cooperate and provides sealing closure of bladder 40 and interior chamber 41 of pressure vessel 13. It will be apparent by comparison of FIGS. 2 and 3, that the introduction of hydraulic fluid under pressure through passages 80 and 82 has forced plug 62 away from plug seat 84 and permitted hydraulic fluid to flow into bladder interior 61. As the hydraulic pressure of the hydraulic fluid Introduced to bladder interior 67 via passages 80 and 82 overcomes the force against bladder 40 exerted by the pressurized gas charge within interior chamber 41, surfaces 58 and 68 of bladder 40 are separated and the volume of bladder interior 67 is increased. In the position shown in FIG. 3, a full volume of hydraulic fluid has been forced into bladder interior 67 which in turn has caused wall portions 48 and 49 of bladder 40 to be maximally separated such that they are Joined solely at bladder end 60. In the maximally distended position shown in FIG. 3, wall portion 59 of bladder 40 provides a transition surface of generally sloped character, the importance of which will be set forth below in greater detail. It should also be noted that plug 62 is forced outwardly from plug seat 84 and is positioned away from passage 82.

In operation, bladder 40 of the present invention accumulator remains configured in the position shown in FIG. 3 so long as the pressure of the hydraulic fluid within bladder interior 67 is balanced by the pressure of the gas charge within chamber interior 41. These two opposing forces are applied to the portion of bladder wall 48 extending between bladder end 60 and the point at which bladder wall 48 contacts chamber wall 42. In the event that the pressure within the hydraulic system to which the present invention hydraulic accumulator is coupled is decreased, the force supplied by the pressurized gas within internal chamber 41 overcomes the balancing force of the hydraulic fluid within bladder interior 67 causing wall portion 59 to move to the left in the manner shown in dashed line representation 59A. As wall portion 59 is moved closer to fluid port fitting 70 to the position shown in dashed line representation 59A, the cooperation of bladder support 61, bladder end 60 and the flexible character of bladder wall 48 cooperate to permit bladder 40 to smoothly reconfigure to the dashed line position shown as 59A in a smooth rolling motion in which surfaces 68 and 58 of bladder interior 67 are brought partially together as shown by dashed line representation 59. This smooth, rolling motion is in accordance with an important aspect of the present invention in which the presence of bladder support 61 and the structure of bladder end 60 cooperate to cause bladder 40 to contract in a smooth predictable manner without wrinking or abrading bladder 40 against chamber wall 42 even during very rapid liquid discharge. In the event additional hydraulic fluid is drawn from bladder interior 67 by a further reduction of hydraulic fluid pressure within the system, bladder 40 continues its rolling contraction reaching a further contracted position such as that shown in dashed line representation 59B. Once again, it should be noted that this rolling contraction of bladder 40 continues without wrinkling or abrasion of the bladder material due to the preformed shape maintained by bladder support 61. It should also be noted that in the position shown in dashed line representation 59B, plug 62 is maintained against chamber wall 42. In most instances of normal operation, the present invention hydraulic accumulator will operate between the intermediate positions shown in dashed line representation 59A and 59B. In the event however, pressure is increased within the hydraulic system, the above-described rolling action of bladder 40 reverses and wall portion 59 is moved to the right, eventually assuming the position shown in FIG. 3. In the event fluid pressure is further reduced within the hydraulic system to which the accumulator is coupled, additional fluid is forced out of bladder interior 67 and a point is reached in which wall portion 59 assumes the position shown in dashed line representation 59C. As can be seen, the rolling character of bladder contraction is maintained from the maximum position shown in FIG. 3 through the intermediate positions shown by dashed line representations 59A, 59B and 59C. It should also be noted that with wall portion 59 assuming the position shown in dashed line representation 59C, plug 62 has been moved from its position abutting chamber 42 and has been moved toward plug seat 84. At this point, it should be noted that in accordance with an important aspect of the present invention, the combination of the above-described rolling contraction and the incline of surface 85 of fluid port fitting 70 cooperate to cause plug 62 to move in a predictable arc from the position shown in FIG. 3 to the dashed line position shown in dashed line representation 59C. In the event additional fluid is drawn from bladder interior 67 by a further reduction of hydraulic fluid pressure, bladder 40 rolls to the position shown in FIG. 2 in which plug 62 is forced against plug seat 84 and passage 82 is closed. The closure of passage 82 by the cooperation of plug 62 and plug seat 84 is, as described above, maintained by the force supplied by the gas charge within internal chamber 41. This closure of passage 82 is, in accordance with an important aspect of the present invention, provided to securely close passage 82 and prevent damage to bladder 40. It should be noted by examination of FIGS. 2 and 3 that the predictable motion provided for plug 62 is further enhanced by the spherical character of plug seat 84 and sealing surface 63. Thus, minor misalignments of plug 62 with respect to plug seat 84 are readily accommodated by the cooperation of the two spherical surfaces which readily mate in a sealing relationship.

Thus, with simultaneous reference to FIGS. 2 and 3, it can be seen that the present invention hydraulic accumulator accommodates the extremes of accumulator operation through a novel rolling motion of bladder 40. It should also be noted that the present invention structure provides for the predictable and smooth rolling of bladder 40 from its-maximally distended position shown in FIG. 3 through intermediate positions shown in dashed line representations 59A, 59B and 59C to its fully closed position shown in FIG. 2. In addition, it should be noted that the present invention structure provides for the use of this predictable bladder motion to provide reliable positioning of plug 62 with respect to plug seat 84 during the closure of passage 82 shown in FIG. 2. As can be seen, the rolling action of bladder 40 achieves volume changes of bladder interior 67 without wrinkling of bladder 40 and without scuffing or abrading of bladder 40 against chamber wall 42.

Figure 4:
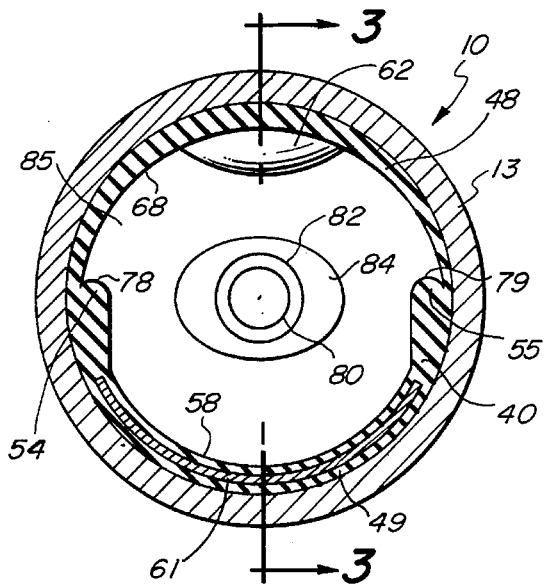
FIG. 4 is a section view of the filled hydraulic accumulator taken along Section lines 4—4 in FIG. 3.

FIG. 4 sets forth a section view of the present invention hydraulic accumulator taken along Section line 4—4 in FIG. 3. As mentioned above, FIG. 3 depicts the configuration of bladder 40 when bladder interior 67 is filled with pressurized hydraulic fluid and plug 62 is positioned away from plug seat 84. Thus, with respect to FIG. 4, pressure vessel 13 defines a cylindrical cross section wall having an interior chamber wall 42. Bladder 40, which as mentioned above is formed of a resilient material such as rubber, describes a pair of semicylindrical wall portions 48 and 49 which combine to form a continuous generally cylindrical bladder 40. The curvatures of bladder interior surface 68 and the exterior surface of wall portion 48 are such that the thickness of bladder wall 48 is greatest at the upper portion and is thinnest at its side portions. Bladder wall 49 defines a generally constant thickness so that surface 58 has a radius of curvature slightly less than the outer surface of bladder wall portion 49. A semicylindrical bladder support 61 within wall portion 49 maintains the curvature thereof. In addition, wall portion 49 defines a pair of opposed fold guides 54 and 55 on either side of wall portion 49 at the junction of wall portion 49 with wall portion 48. Fold guides 54 and 55 each define respective curved surfaces 78 and 79.

In the position shown in FIG. 4, namely that corresponding to the position of bladder 40 when the present invention hydraulic accumulator is substantially filled with pressurized hydraulic fluid, it should be noted that portions 48 and 49 of bladder 40 are conformed to and pressed against chamber wall 42 of pressure vessel 13. It should be further noted that plug 62 is carried by wall portion 48 of bladder 40 to a position at the top of pressure vessel 13 which removes it from plug seat 84 and passage 82. Thus, in the position shown in FIG. 4, bladder 40 is substantially filled with hydraulic fluid which is in direct communication via passages 82 and 80 with the remainder of the hydraulic system.

FIG. 5 sets forth a section view of the present invention accumulator taken along Section lines 5—5 in FIG. 2. It should be recalled that FIG. 2 depicts the position of bladder 40 when the present invention hydraulic accumulator is emptied or substantially emptied of hydraulic fluid and plug 62 is sealingly received within plug seat 84. Under such circumstance, interior chamber 41 is substantially filled with the above-described compressible gas charge and bladder 40 is folded to the trough-like configuration described above in which bladder wall 48 is folded downwardly about fold guides 54 and 55 such that surface 68 thereof overlies surface 58 of bladder wall 49. It should be noted that in folding downward fold guides 54 and 55, bladder wall 48 is folded about curved surfaces 78 and 79 to achieve a rounded or roll-like folding which protects bladder wall 48 from scuffing or abrasion against chamber wall 42 and which precludes bladder 40 from the wrinkling found in other bladder configurations.

With simultaneous reference to FIGS. 4 and 5, it should be noted that the curved, semicylindrical construction of bladder support 61 within bladder wall 49 maintains the position of bladder wall 49 against chamber wall 42 and provides a secured surface about which the above-described bladder folding takes place. It should be further noted that the thinness of bladder wall 48 adjacent fold guides 54 and 55 and the the shapes of curved surfaces 78 and 79 are intended to minimize bending stresses in bladder wall 48 in flexion.

What has been shown is a hydraulic accumulator in which an elongated pressure vessel contains an elongated hollow bladder fillable from one end and closed at the other. The bladder is configured when empty to form a trough-like semicylindrical member. Entering hydraulic fluid expands the bladder internal volume in a predetermined and preestablished rolling fold which avoids destructive wrinkling of the bladder as well as the abrasive scuffing of the bladder against the interior walls of the pressure vessel found in other hydraulic accumulators. Also, the carefully predetermined motion of the bladder ensures that, even during very rapid exhaust of its contained hydraulic fluid exhaust port, the sealing device will unfailingly seat properly to avoid the previously encountered common bladder extrusion problem associated with poorly controlled bladder motion. The hydraulic accumulator shown uses a readily manufacturable pressure vessel design free of the need for welded seams. In addition, the present invention hydraulic accumulator provides a collapsible resilient bladder structure which consists of a single molded element and requires no additional seams or additional manufacturing steps beyond the molding process. Also, the carefully controlled motion bladder configuration herein described is not sensitive to gravity and buoyancy forces thus optimum mounting orientation is not restricted to having the axis vertical as is traditionally required.

Figure 6:
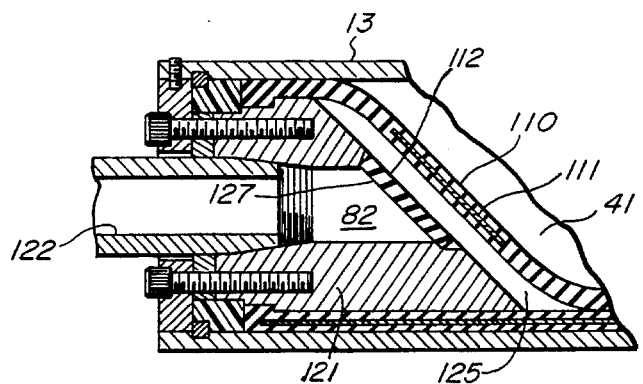
FIG. 6 is a partial section view of an alternate embodiment of the present invention hydraulic accumulator.

FIG. 6 sets forth an alternate embodiment for the present invention shown in partial section view. It should be noted at the outset that the alternate embodiment of FIG. 6 is identical to the above-described embodiment with the exception of the structure associated with plug 62 and plug seat 84 in the foregoing described apparatus. Accordingly, a fluid port fitting 121, which is substantially the same as fluid port fitting 70, differs therefrom in that an inclined surface 123 extends across fluid port fitting 121 and supports a screen 112. A passage 122 is coupled to screen 112 and provides fluid coupling to a bladder interior 125. Passage 122 provides the same communication to the system as previously provided by passage 82 in fluid port coupling 70 in the above-described embodiment. Screen 112 provides a reinforcing structure extending across passage 122 and is substantially flush with surface 123 of fluid port fitting 121. It should be noted that screen 112 may be constructed in any number of structures with the primary object that it provides a plurality of fluid apertures 127 which permit the transfer of hydraulic fluid to and from bladder interior 125 via passage 122. As in the above-described embodiment, pressure vessel 13 defines an interior chamber 41 which receives a charge of compressed gas as also is set forth above. A flexible bladder 120, which is generally identical to bladder 40 of the above-described embodiment with the exception of the sealing portion associated with plug 62, defines a flat portion 110 which in turn supports an interior plate 111. In similarity to the above-described operation of plug 62 and plug seat 84, flat portion 110, plate 111 and bladder 120 are configured such that flat portion 110 overlies screen 112 once hydraulic fluid is removed from bladder interior 125 such that passage 122 is sealed providing effective closure thereof. During such closure, plate 111 is generally aligned with screen 112 and serves to cooperate with screen 112 to support flat portion 110 of bladder 120. This support of flat portion 110 of bladder 120 is required to prevent the pressurized gas within internal chamber 41 from forcing bladder 120 outwardly through passage 122 in the event of a pressure drop within the hydraulic system occurs to the absence of hydraulic fluid within bladder interior 125. In the embodiment shown in FIG. 6, screen 112 and plate 111 are both used to ensure maximum protection of bladder 120. However, it will be apparent to those skilled in the art that in some applications screen 112 may be used alone without plate 111 and provide sufficient protection and support for bladder 120. Conversely, it will be equally apparent that in certain applications screen 112 may be omitted and plate 111 used alone to support and protect bladder 120. In all other respects, the embodiment of FIG. 6 functions in the same manner set forth above in the previously described embodiments in that a charge of compressible gas within internal chamber 41 is operative to provide closure of passage 122 in the absence of pressurized hydraulic fluid within bladder interior 125. Similarly, the introduction of pressurized hydraulic fluid within passage 122 forces flat portion 110 away from screen 112 opening passage 122 and permitting the introduction of pressurized hydraulic fluid into bladder interior 125. Bladder 120 undergoes the same rolling motion as set forth above for bladder 40 in accommodating the volume of pressurized hydraulic fluid within the bladder.

It should be noted that while the present invention accumulator is shown in its preferred embodiment configured to be utilized in a hydraulic system, the present invention accumulator is equally applicable to other systems in which a pressurized generally noncompressible fluid is processed. For example, such accumulators are frequently used in pipeline systems in which a generally incompressible fluid is transported through pressurized piping systems. By way of further example, hydraulic systems which distribute water are frequently subject to the type of pressure surges and pressure variations for which the present invention accumulator is equally appropriate. In essence, the present invention accumulator is suited for use in most if not all environments in which a generally incompressible fluid is subjected to pressure variations. Thus, it will be apparent to those skilled in the art that the present invention accumulator is not restricted in spirit and scope to conventional machine hydraulic systems but is instead capable of broad application to a number of such systems.

While particular embodiments of the invention have been shown and described, it will be obvious to those skilled in the art that changes and modifications may be made without departing form the invention in its broader aspects. Therefore the aim in the appended claims is to cover all such changes and modifications as fall within the true spirit and scope of the invention.

That which is claimed is:

1. A hydraulic accumulator comprising:

an elongated pressure vessel having first and second ends and a continuous wall therebetween forming an interior vessel chamber having an interior wall surface;

a charging valve supported at said first end permitting the injection of a charge of compressible fluid;

a fluid coupling supported at said second end for coupling said hydraulic accumulator to a source of pressurized hydraulic fluid;

closure means for closing flow through said fluid coupling;

an elongated hollow flexible bladder having a first portion sealingly coupled to said fluid coupling and a second portion extending into said vessel chamber defining an interior bladder chamber, having an external shape generally corresponding to said vessel interior chamber, and a closed end portion defining a semicircular edge; and bladder support means forcing said bladder against said interior wall surface of said vessel chamber, said second portion defining a sloped transition portion at said closed end and a pair of interior fold guides formed in said second portion of said bladder within said bladder chamber and extending from said first portion to said semicircular edge, said bladder folding and unfolding along said fold guides.

2. A hydraulic accumulator as set forth in claim 1 wherein said vessel chamber of said pressure vessel is generally cylindrical and wherein said bladder is generally cylindrical.

3. A hydraulic accumulator as set forth in claim 2 wherein said bladder support means include a rigid elongated curved member having a curvature corresponding to said interior wall surface.

4. A hydraulic accumulator as set forth in claim 3 wherein said tapered closed end conforms generally to said curvature of said bladder support means.

5. A hydraulic accumulator as set forth in claim 4 wherein said bladder is formed of a single molded unit and defines a continuous flexible bladder wall and wherein said elongated curved member is molded within a portion of said flexible wall.

6. A hydraulic accumulator as set forth in claim 5 wherein said bladder wall defines an interior surface having a pair of parallel fold guides positioned on opposite sides of said bladder interior chamber and extending from said closed end toward said fluid coupling, said bladder being foldable about said fold guides to a collapsed position An which said bladder assumes a semicylindrical concave shape conforming to said interior surface of said vessel chamber.

7. A hydraulic accumulator as set forth in claim 6 wherein said bladder smoothly folds about said fold guides when hydraulic fluid is forced from said bladder chamber via said fluid coupling and wherein the bladder folding is controlled by the volume of hydraulic fluid within said bladder chamber.

8. A hydraulic accumulator as set forth in claim 7 wherein said fluid coupling defines a center passage and wherein said closure means includes a concave generally spherical plug seat encircling said center passage and a plug having a generally convex spherical surface corresponding to said plug seat supported upon said bladder wall within said bladder chamber, said plug being received by said plug seat when said bladder folds to its collapsed position.

9. For use in a pressurized fluid system in which a generally incompressible fluid is subjected to pressure variations, an accumulator for accommodating and absorbing such pressure variations comprising:

an elongated pressure vessel having an interior vessel chamber and first and second ends;

a fluid coupler for coupling said accumulator to said pressurized fluid system, said fluid coupler being sealingly coupled to said first end and having a guide portion extending into said vessel chamber;

an elongated hollow flexible bladder having an open end sealingly coupled to said fluid coupler, a closed end defining a semicircular edge, and a continuous flexible bladder wall therebetween forming a transition to said semicircular edge and forming a bladder chamber and defining a pair of interior fold guides formed in said bladder wall and extending from said semicircular edge to said open end, said bladder wall and said closed end extending into said vessel chamber and being configurable in a folded position in which said bladder is collapsed upon itself to form a concave member and an extended position in which said bladder smoothly unfolds to form a convex member generally conforming to a portion of said vessel interior chamber;

charging means, coupled to said vessel chamber and supported at said second end of said pressure vessel, for injecting a quantity of pressurized compressible fluid into said vessel chamber outside said bladder; and bladder support means, coupled to a portion of said bladder wall, for imparting a contour to a portion of said bladder wall corresponding to a portion of said vessel chamber and for causing said bladder to smoothly fold and unfold between said folded and extended positions along said interior fold guides.

10. An accumulator as set forth in claim 9 wherein said accumulator further includes closure means for closing said fluid coupler coupling to said pressurized system when said bladder is in its folded position.

11. An accumulator as set forth in claim 10 wherein said vessel chamber is generally cylindrical defining a circular cross section and wherein said guide portion of said fluid coupler defines a circular cross section and a fluid passage extending through said fluid coupler and communicating with said bladder chamber.

12. An accumulator as set forth in claim 11 wherein said guide portion of said fluid coupler defines a generally planar inclined surface and a plug seat surrounding said fluid passage and wherein said closure means include a plug supported by said bladder wall within said bladder chamber and having a seal surface configured to cooperate with said plug seat to affect closure of said fluid passage.

13. An accumulator as set forth in claim 12 wherein said bladder wall folds when said bladder is configured in said folded position to position said plug overlying said plug seat and unfolds to move said plug away from said plug seat when said bladder is configured In its extended position.

14. An accumulator as set forth in claim 13 wherein said plug seat defines a concave spherical surface and wherein said seal surface of said plug defines a convex spherical surface.

15. An accumulator as set forth in claim 14 wherein said open end of said bladder defines a seal ring sealingly engaging said fluid coupling.

16. An accumulator as set forth in claim 15 wherein said closed end defines a semicircular edge and wherein said continuous bladder wall defines a cylindrical wall and a sloped transition wall portion between said cylindrical wall and said semicircular edge.

17. An accumulator as set forth in claim 16 wherein said bladder wall defines a pair of interior fold guides formed in said bladder wall within said bladder chamber and extending from said semicircular edge to said inclined surface of said fluid coupler, said bladder folding and unfolding about said fold guides.

18. An accumulator comprising:

an elongated pressure vessel having a cylindrical interior vessel chamber;

a fluid port coupled to said interior vessel chamber;

an elongated flexible bladder supported within said vessel chamber having a bladder chamber in communication with said fluid port, said bladder having a closed semicircular edge and being formed into a semicylindrical trough-like configuration in which the volume of said bladder chamber is minimized and defining a pair of interior fold guides within said bladder chamber extending from said semicircular edge toward said fluid port; and means for introducing a charge of compressible fluid into said vessel chamber external to said bladder;

said bladder smoothly unfolding and folding along said fold guides between its semicylindrical trough-like configuration and a generally cylindrical extended position as a charge of incompressible fluid is forced into and from said bladder chamber through said fluid port.

19. An accumulator as set forth in claim 11 wherein said guide portion of said fluid coupler defines a generally planar inclined surface and a surrounding said fluid passage and screen member having a plurality of apertures therethrough, overlying said passage, and wherein said closure means include a portion of said bladder wall within said bladder chamber and having a seal surface configured to cooperate with said screen member to affect closure of said fluid passage.

20. An accumulator as set forth in claim 19 wherein said bladder wall folds when said bladder is configured in said folded position to position said seal surface overlying said plug seat and unfolds to move said seal surface away from said screen member when said bladder is configured in its extended position.

21. A hydraulic accumulator comprising:

an elongated pressure vessel having first and second ends and a continuous wall therebetween forming an interior vessel chamber having an interior wall surface;

a fluid coupling supported at said second end for coupling said hydraulic accumulator to a source of pressurized hydraulic fluid;

closure means for closing flow through said fluid coupling;

an elongated hollow flexible bladder having a first portion sealingly coupled to said fluid coupling, a semicircular closed end portion and a second portion extending into said vessel chamber defining an interior bladder chamber, having an external shape generally corresponding to said vessel interior chamber and defining a pair of interior fold guides within said bladder chamber extending from said semicircular closed end toward said first portion;

means forcing said bladder against said interior wall surface of said vessel chamber; and charging means for injecting a charge of compressible fluid into said interior vessel chamber external to said bladder, said bladder folding and unfolding along said fold guides.

\* \* \* \* \*